United States Patent Office.

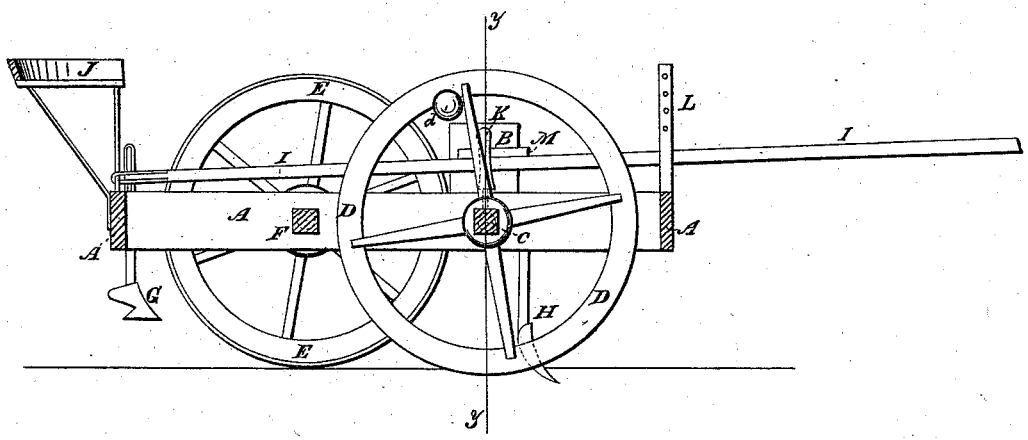
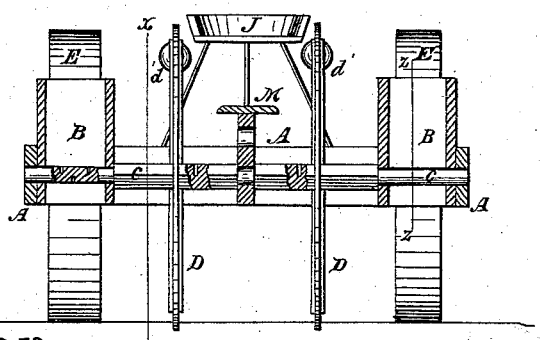
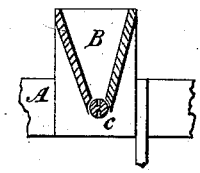

E. E. CHESNEY, OF ABINGDON, ILLINOIS.

Letters Patent No. 63,859, dated April 16, 1867.

---

IMPROVEMENTS IN SEED-PLANTERS.

---

The Schedule referred to in these Letters Patent and making part of the same.

---

TO ALL WHOM IT MAY CONCERN:

Be it known that I, E. E. CHESNEY, of Abingdon, in the county of Knox, and State of Illinois, have invented a new and useful Improvement in Seed-Planter; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved seed-planter taken through the line $x\,x$, fig. 2.

Figure 2 is a vertical cross-section of the same taken through the line $y\,y$, fig. 1.

Figure 3 is a detail vertical section of one of the seed-boxes taken through the line $z\,z$, fig. 2.

Similar letters of reference indicate like parts.

My invention has for its object to furnish an improved seed-planter by means of which corn or other seeds may be planted accurately in check-row or in drill, as may be desired; and it consists of an improved seed-planter, the gauge-wheels of which are weighted and attached to a single shaft which passes through the hoppers and forms the dropping device, the supporting-wheels of which are also attached to a single shaft and act as coverers. It also consists in the peculiar manner in which the tongue is connected with the frame of the machine, and in the combination of one or more sets of ploughs with said frame; the whole being constructed and arranged as hereinafter more fully described.

A is the frame of the machine, which I usually make about five feet long and five feet wide. The seed-boxes B are attached to the forward parts of the side bars of the frame so as to be about four feet from centre to centre, or whatever distance it is desired the rows should be apart. C is a shaft, which passes through the lower parts of the seed-boxes B, and works in bearings in the side and centre bars of the frame A. D are the gauge-wheels, which are attached to the shaft C and carry it with them as they revolve. The rims of the wheels D are made of steel so as to cut down through the sods and ploughed-up ground to a comparatively level plane to insure the seeds being dropped at regular distances apart. The wheels D are about two and a half feet in diameter, or about eight feet in circumference, which, when they drop seed twice at each revolution, make the hills about four feet apart. They are also attached to the spokes in such a way that the ends of the spokes may mark the ground in a line with the hills to guide the operator in starting in the next time, so that the seed may be planted in perfect check-row. $d'$ are weights attached to one side of the wheels D, so that when the forward end of the frame A is raised the wheels D may always take the same position. This enables the operator to start in at the side of the field without delay to adjust the machine, so that the hills may be in exact line with the hills previously planted. A number of holes are formed in the parts of the shaft C, which pass through the seed-boxes, of such dimensions as to contain the proper amount of seed to plant a hill, which seed is conveyed from the seed-boxes and dropped upon the ground by the revolution of said shaft. Such of these holes as are not required for use may be kept filled up, so that the machine may be changed from a planting to a drilling machine by simply opening the said holes. E are the supporting-wheels, which are attached to the shaft F revolving in bearings in the side and central bars of the frame A. These wheels are placed directly behind the seed-boxes so that they may also act as rollers to cover the seed; and they are usually made about two feet in diameter and from six to nine inches broad. The wheels E may be adjustably attached to the shaft F, so that they may be moved inward, if desired, and the covering be done by ploughs G adjustably or solidly attached to the rear parts of the side bars of the frame. H are ploughs, attached to the side bars of the frame A in front of the seed-boxes B to open up the ground for the reception of the seed. I is the tongue, which is hinged to the rear bar of the frame A, as shown in fig. 1, directly beneath the seat J which is attached to the rear part of said frame. L are upright bars, attached to the front cross-bar of the frame A, between which the tongue passes. Several holes are made through the uprights L for the reception of a pin. By so placing the pin as to retain the tongue close down upon the frame, the forward part of the machine may be held up when travelling or when it is not desired that the dropping device should operate. By placing the pin at a greater or less distance above the tongue the depth of the ploughing or furrowing may be regulated at pleasure. By this construction the driver by placing his feet upon the tongue I can easily raise the fore part of the machine, and stop the operation of the dropping device whenever desired. This is especially convenient when turning at the ends of the rows, and enables him to start the dropping device at the proper time to bring the hills in a line with those previously planted. If desired the wheels D may be omitted and the shaft C operated with the hand-lever K placed in a hole in said shaft and worked by a person sitting upon a seat, M, attached to the tongue I. By removing the wheels D and E the machine may be used as a cultivator for cultivating the crop.

What I claim as new, and desire to secure by Letters Patent, is —

1. The combination of the gauge-wheels D, and single shaft C, with the seed-boxes B, and frame A of the machine, substantially as herein shown and described.

2. Operating the shaft C, to drop the seed by means of a hand-lever, K, substantially as herein shown and described.

3. The combination of the tongue I, and upright bars J, with each other and with the frame of the machine, substantially as herein shown and described and for the purpose set forth.

4. The combination of the ploughs H and G with the frame of the machine, substantially as herein shown and described.

The above specification of my invention signed by me this 22d day of October, 1866.

E. E. CHESNEY.

Witnesses:
    C. T. CHESNEY,
    JAMES THOMPSON.